United States Patent [19]
Kimbel et al.

[11] Patent Number: 5,517,654
[45] Date of Patent: May 14, 1996

[54] SYSTEM FOR PARALLEL IMPLEMENTATION OF COMBINATORIAL OPTIMIZATION IN A MULTIPROCESSOR NETWORK FOR GENERATING SEARCH GRAPHS FOR SOLVING ENUMERATIVE PROBLEMS

[75] Inventors: Jeffrey C. Kimbel, Forest Lake; Marc D. Diamond, Inver Grove Heights; Stephen E. Ross, Minneapolis; Charles L. Rennolet, St. Paul, all of Minn.

[73] Assignee: FMC Corp., Chicago, Ill.

[21] Appl. No.: 888,936

[22] Filed: May 26, 1992

[51] Int. Cl.[6] .............................. G06F 15/18; G06F 15/16
[52] U.S. Cl. .................. 395/800; 395/650; 364/230.3; 364/228.3; 364/229.2; 364/230.6
[58] Field of Search .................................. 395/200, 325, 395/800, 650; 371/94.1

[56] References Cited

U.S. PATENT DOCUMENTS

| | | | |
|---|---|---|---|
| 4,543,630 | 9/1985 | Neches | 364/200 |
| 4,858,147 | 8/1989 | Conwell | 364/513 |
| 5,101,480 | 3/1992 | Shin et al. | 395/325 |
| 5,146,540 | 9/1992 | Natarajan | 395/11 |
| 5,170,393 | 12/1992 | Peterson et al. | 370/94.1 |

OTHER PUBLICATIONS

Wang & Jamieson, "Autonomous Parallel Heuristic Combinatorial Search", 1993 IEEE.

*Primary Examiner*—Thomas C. Lee
*Assistant Examiner*—Marc Weinstein

[57] ABSTRACT

The method and apparatus disclosed herein relates to parallel implementation of a combinatorial optimization in a multiprocessor network. The system operates as an intermediary between a root processor and a multiprocessor network. The system generates shadow nodes which are used to occupy idle capacity available within the multiprocessor network. Particularly, the shadow nodes are used to refine solutions for enumerative problems, search graph and the like while providing a near 100% utilization of a processor time in a multiprocessor network. The system provides a fully asynchronous and homogenous system design to enable the creation of locally ordered expansion queues.

8 Claims, 15 Drawing Sheets

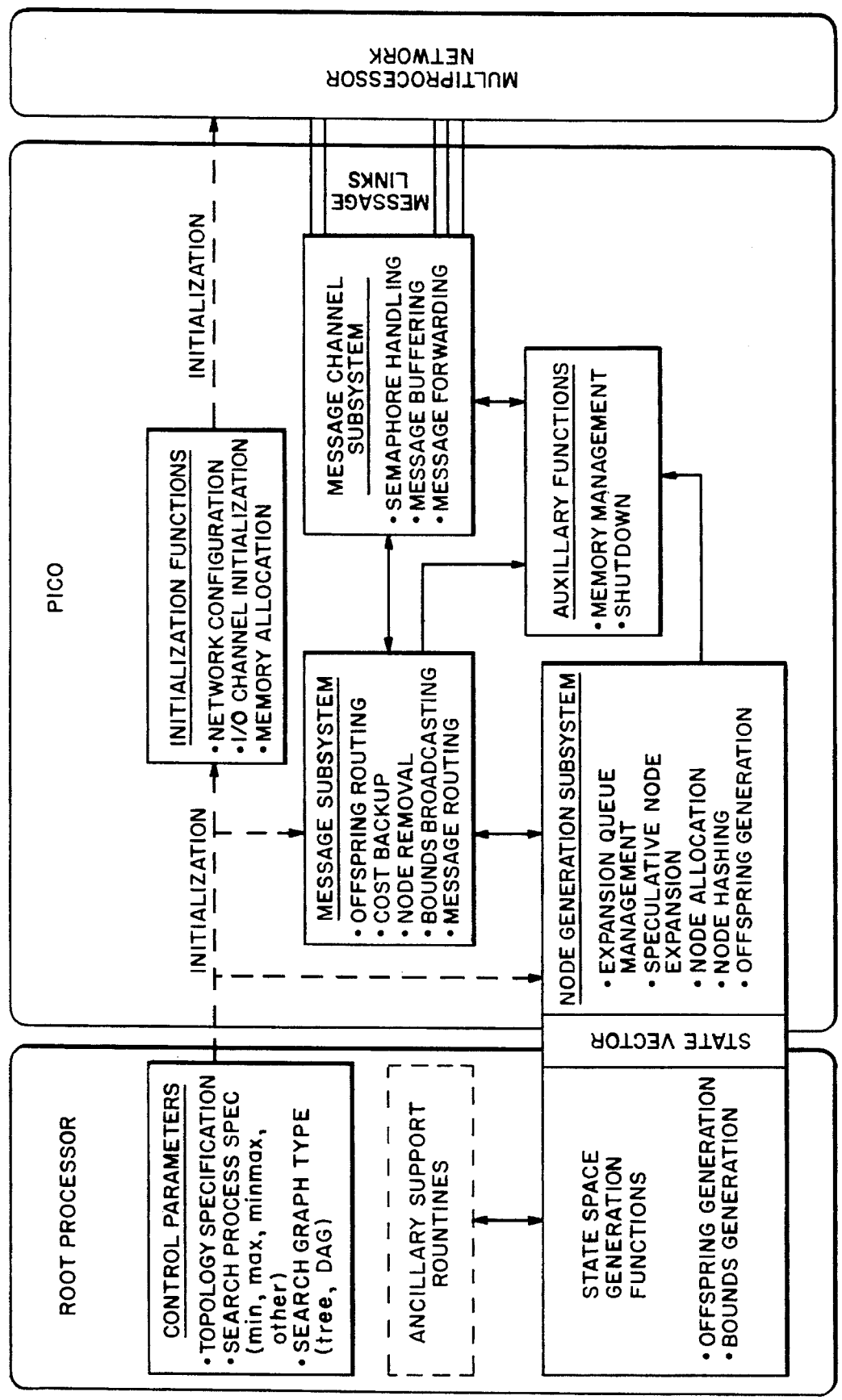
FIG_1A
SYSTEM ARCHITECTURE

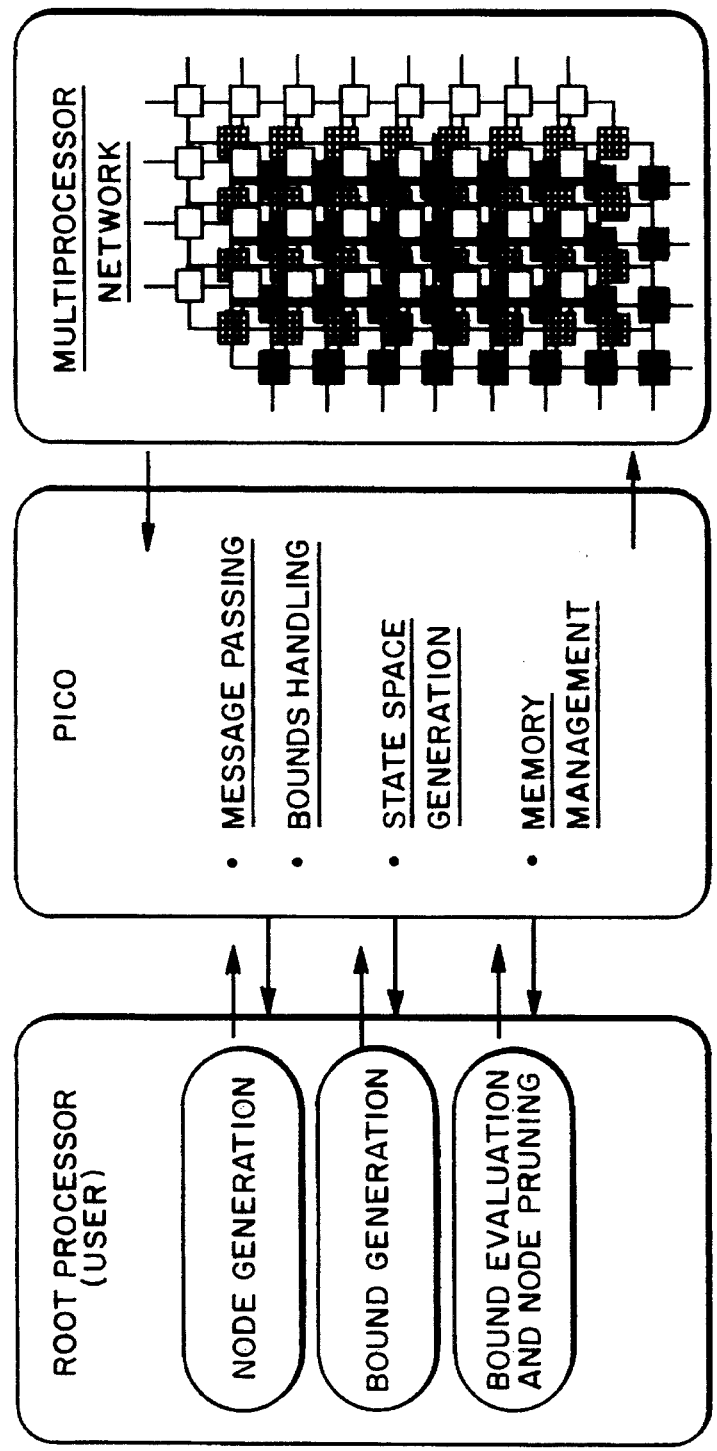
FIG_1B

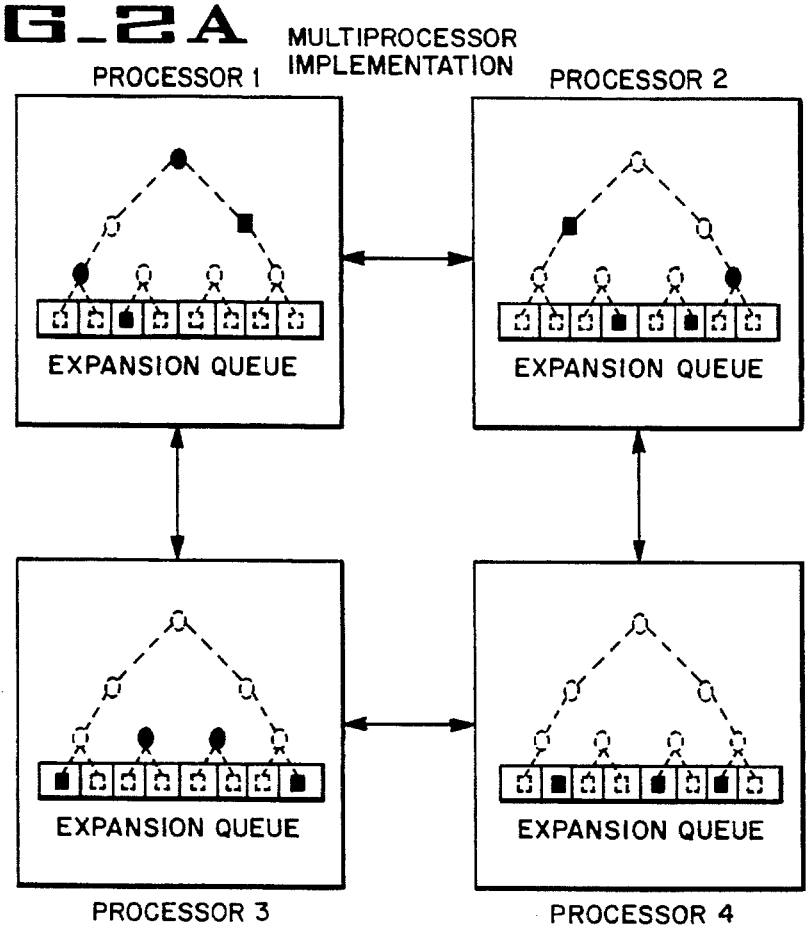
FIG_2A MULTIPROCESSOR IMPLEMENTATION
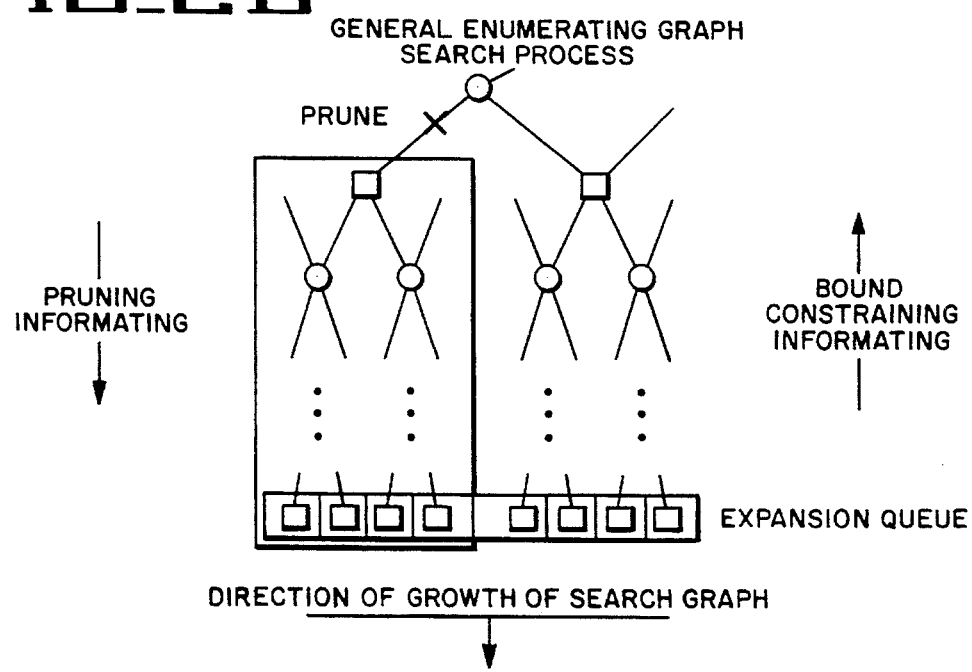
FIG_2B

FIG_3A
SHADOW NODE SYSTEM
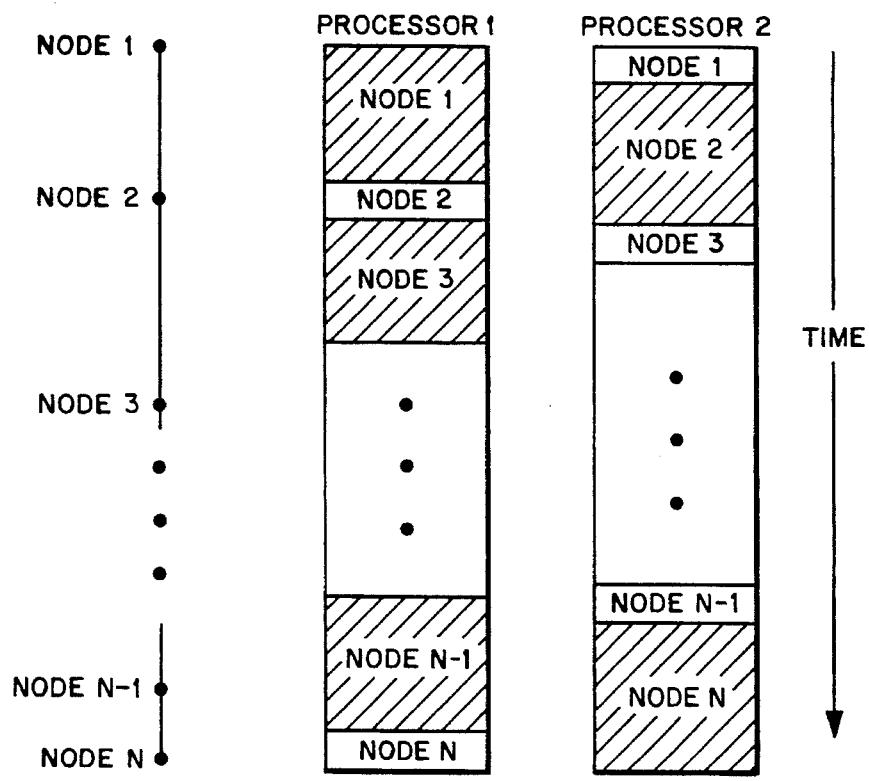
FIG_3B
SHADOW NODE SYSTEM
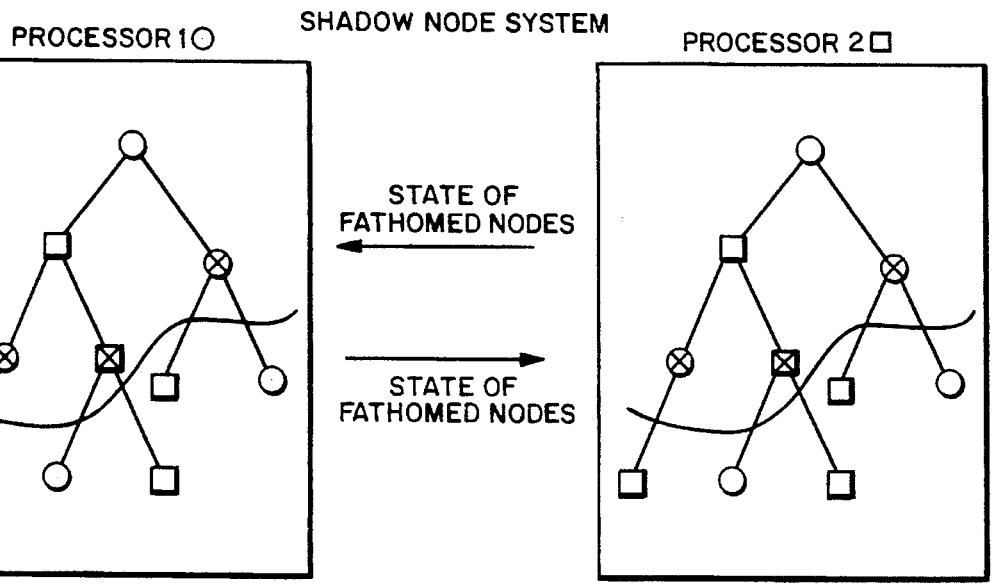

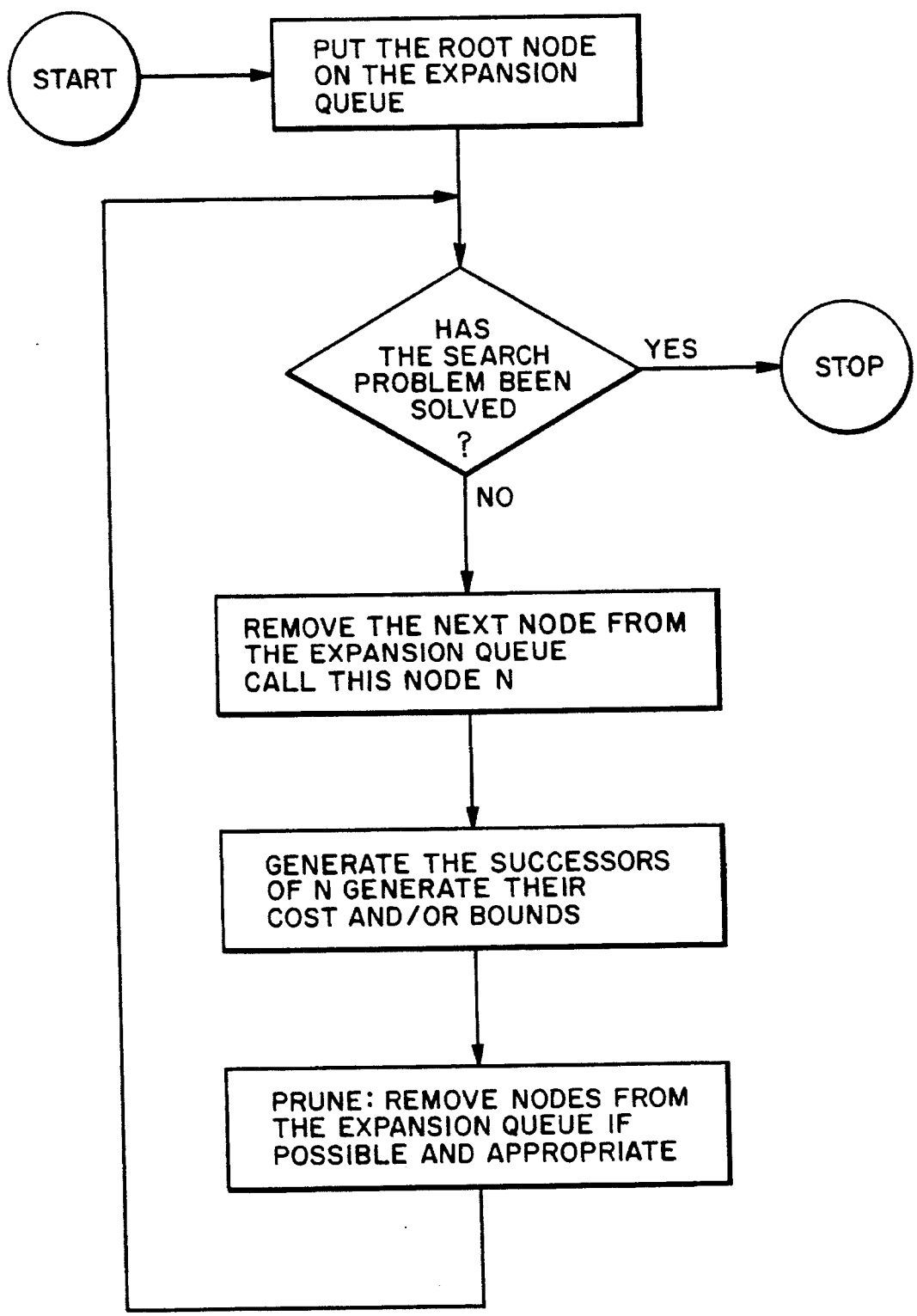

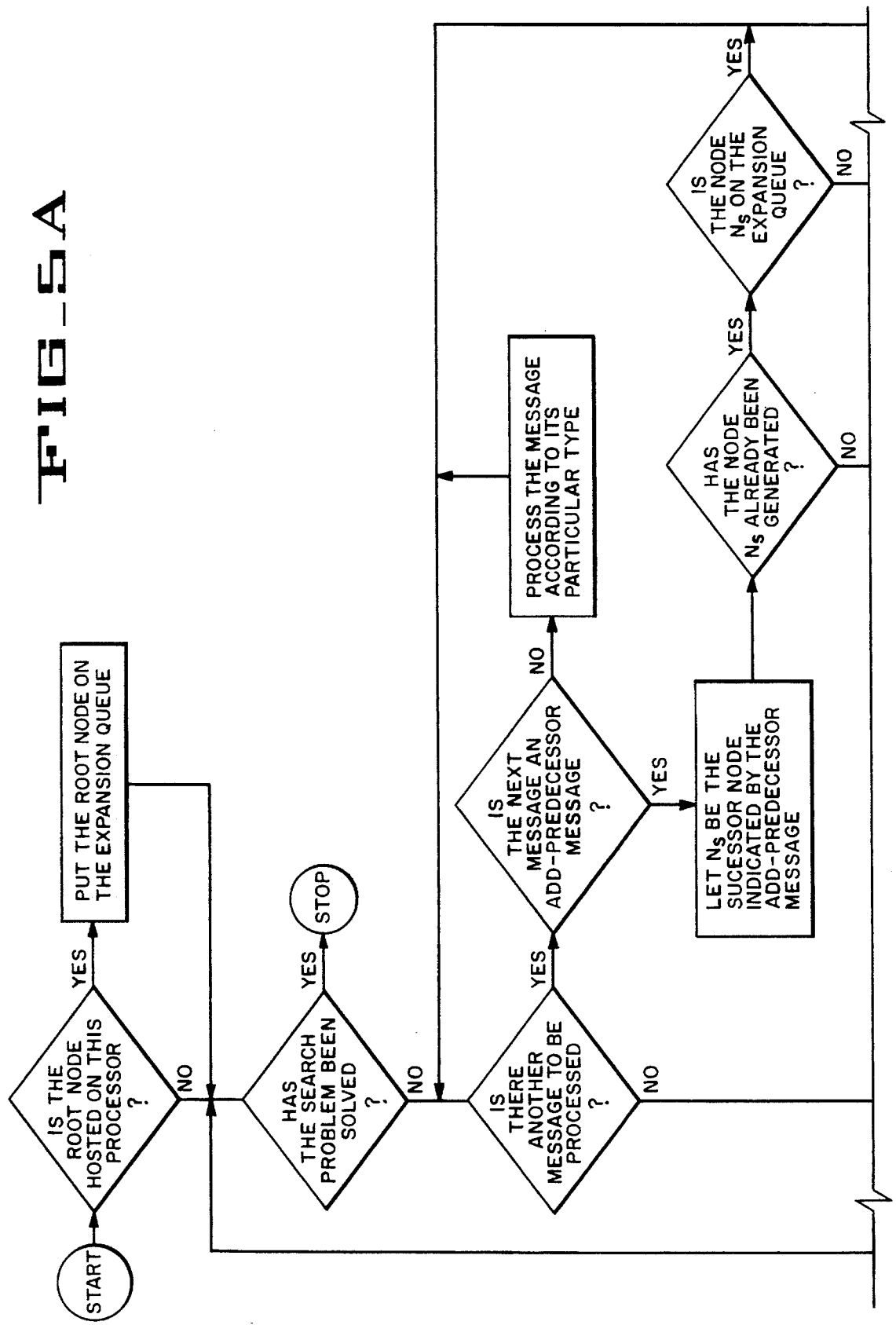

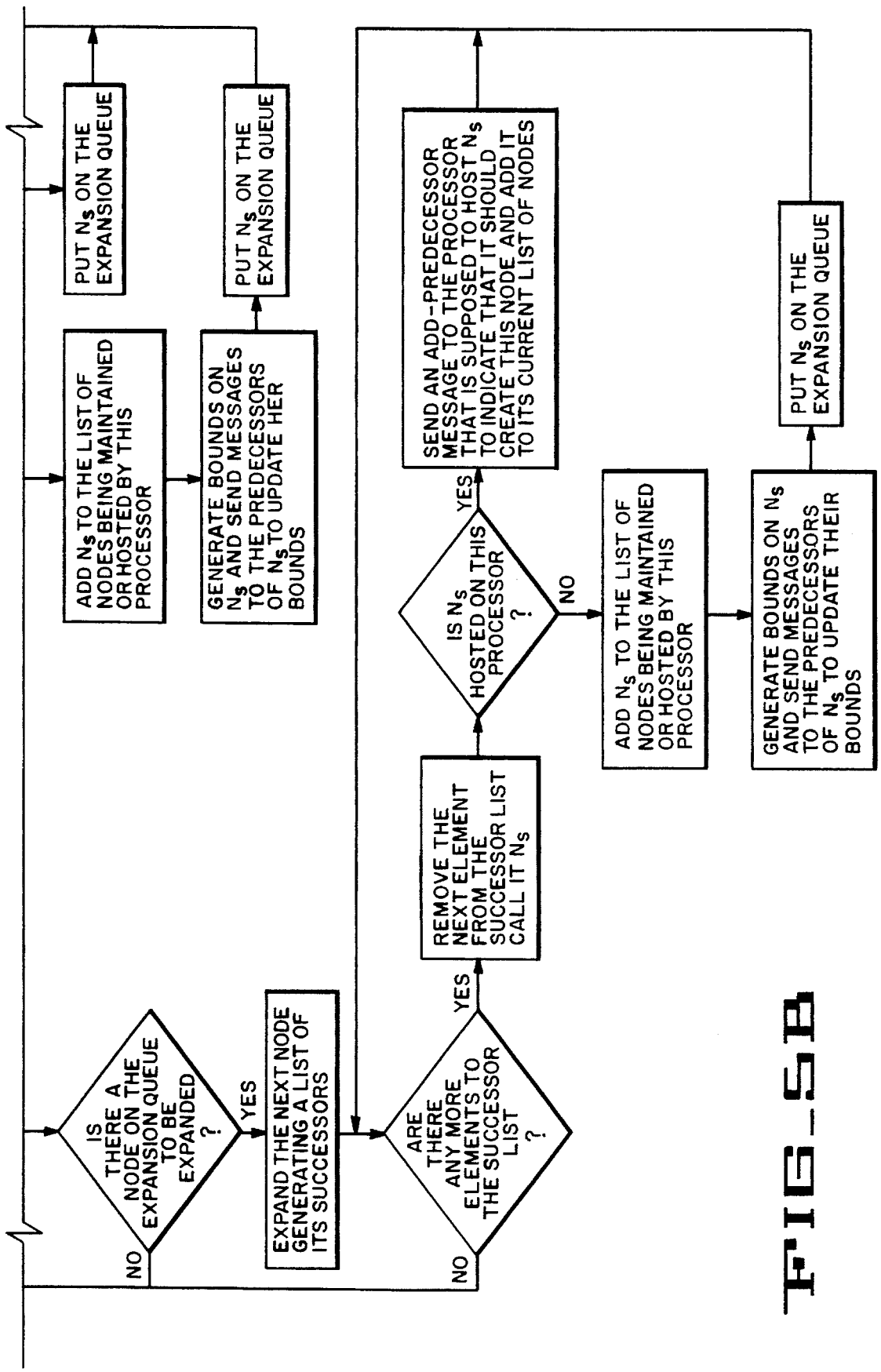
FIG_5B

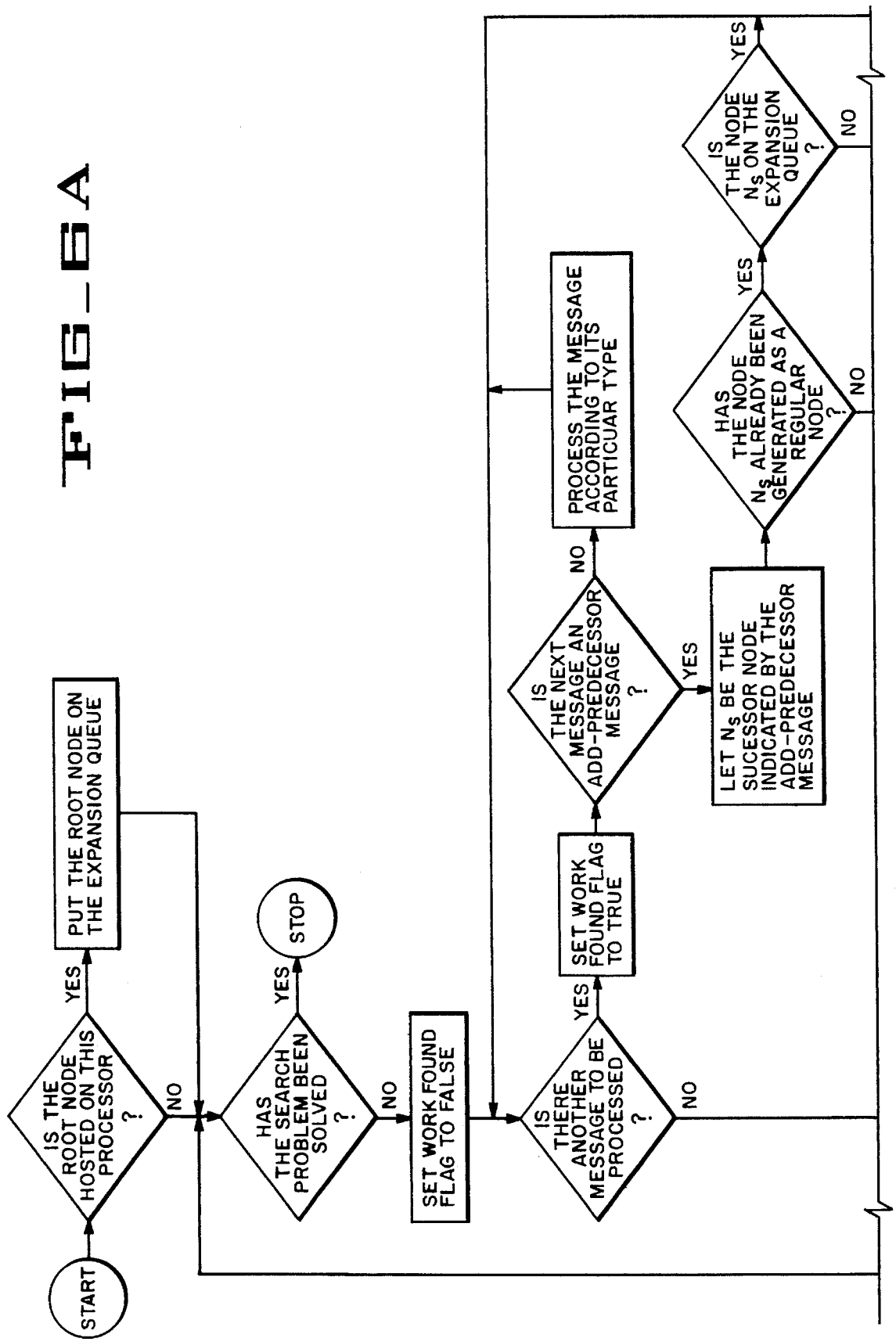

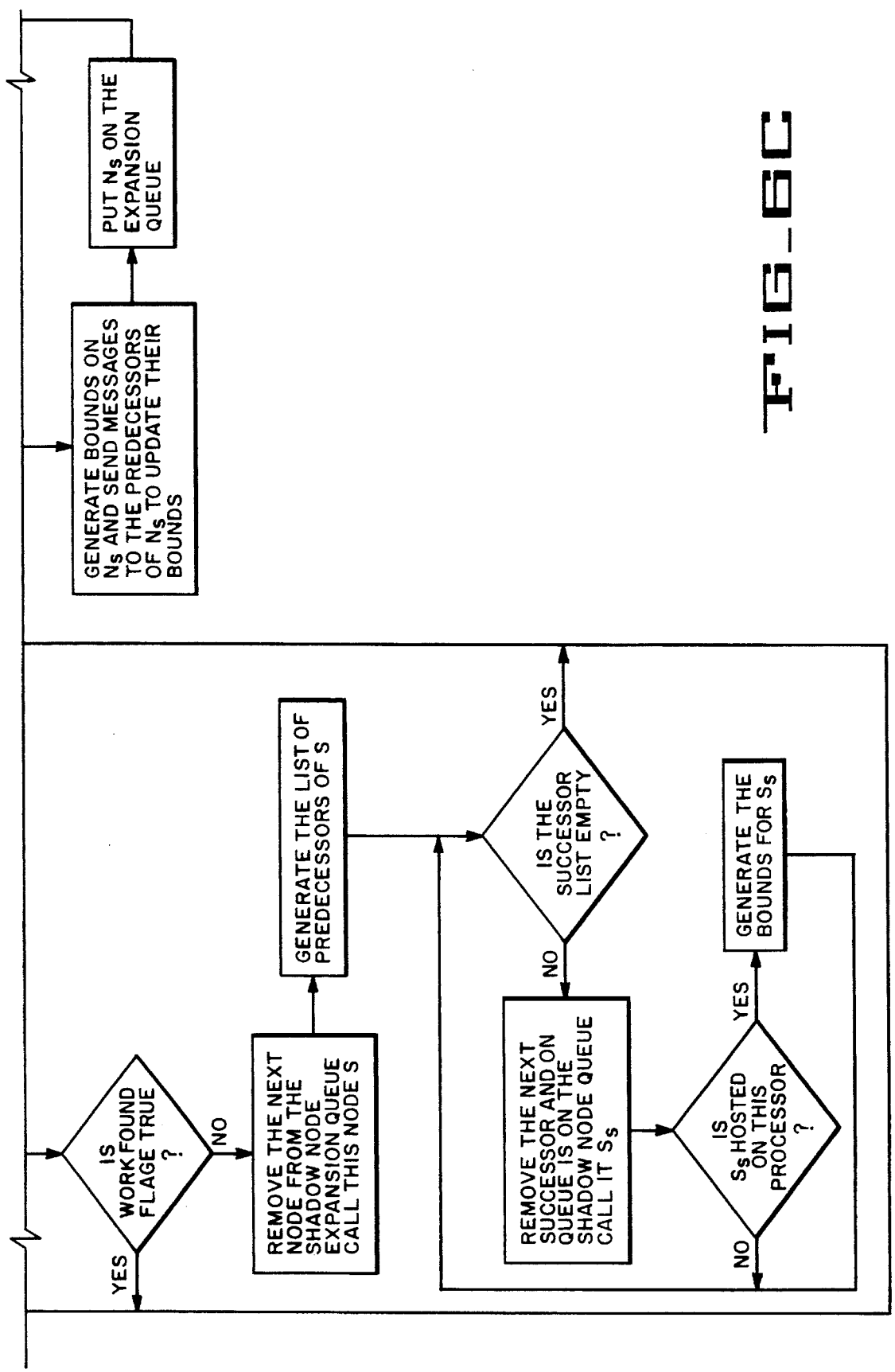
FIG_6C

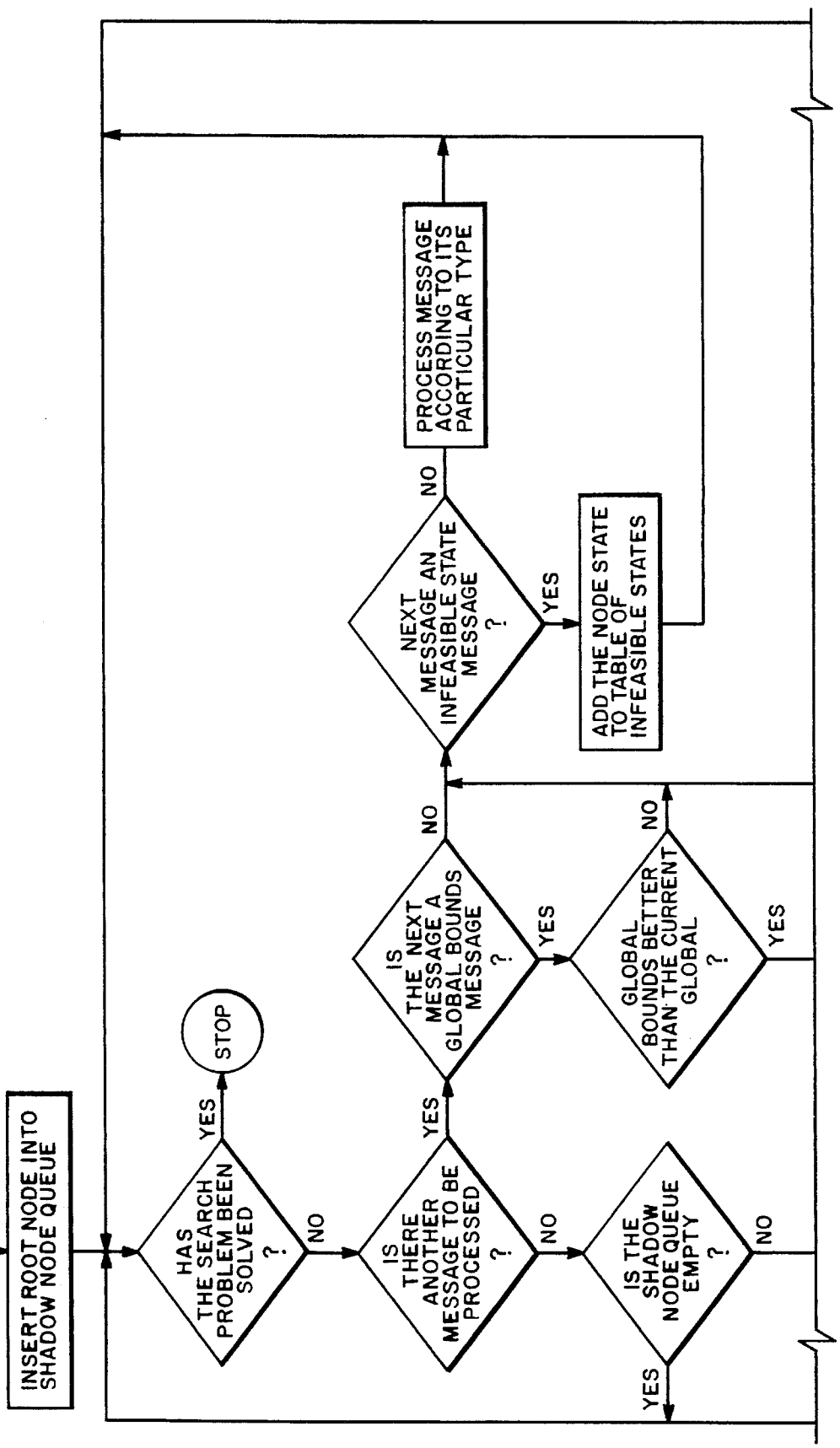
FIG_7A

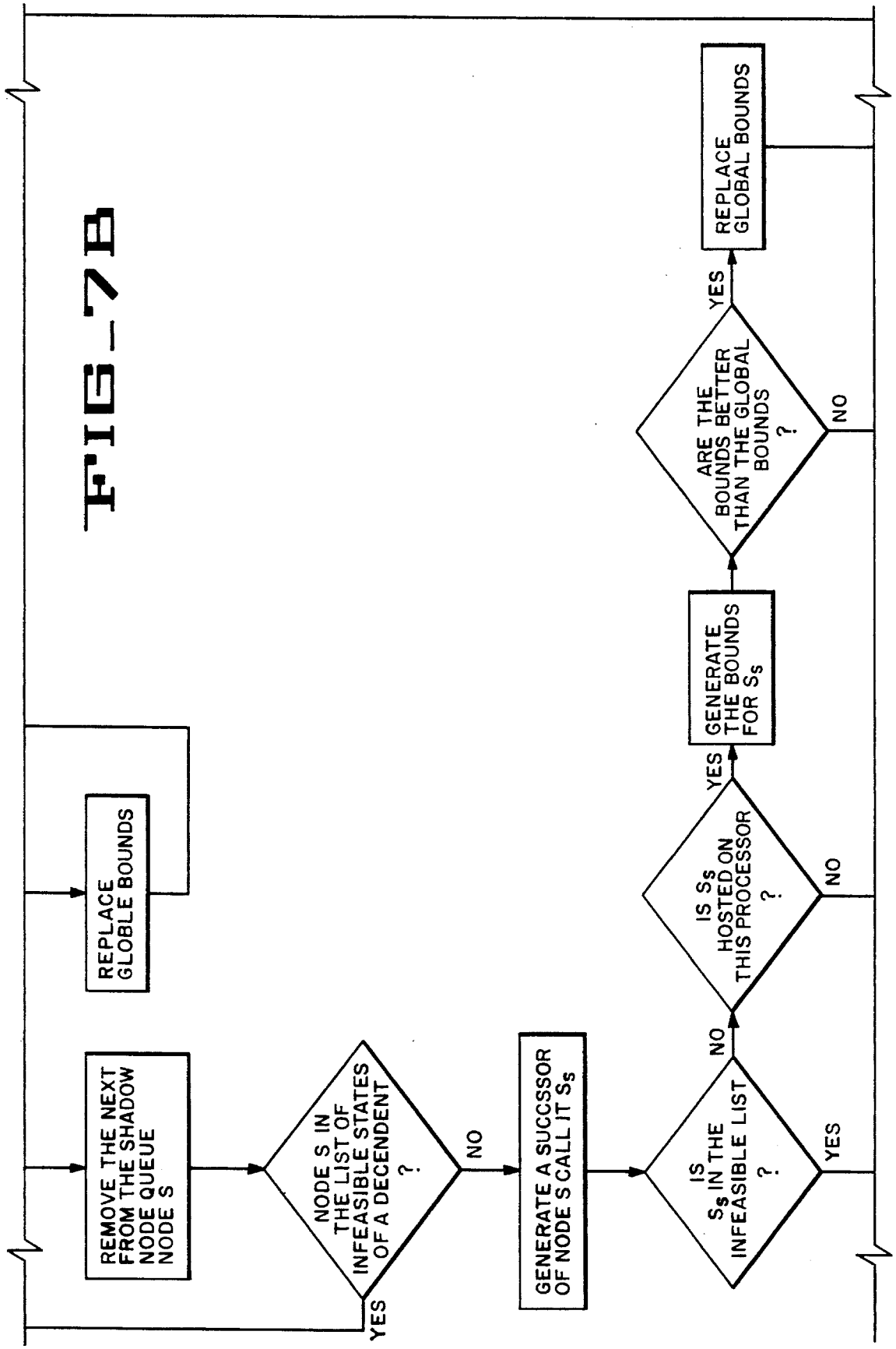

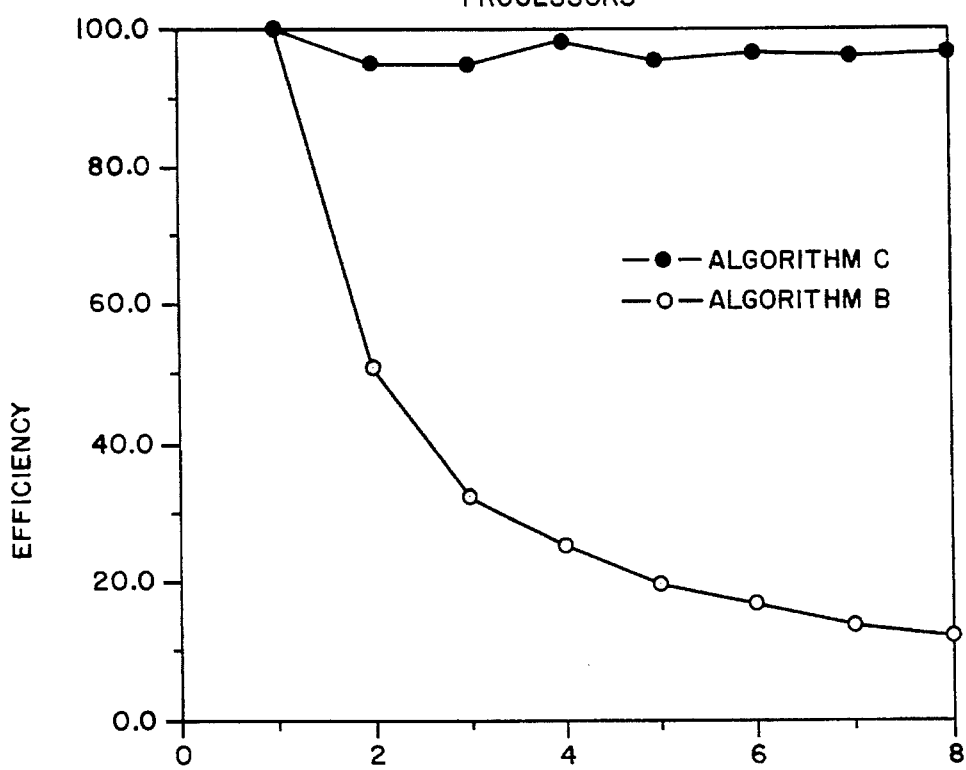
FIG_8
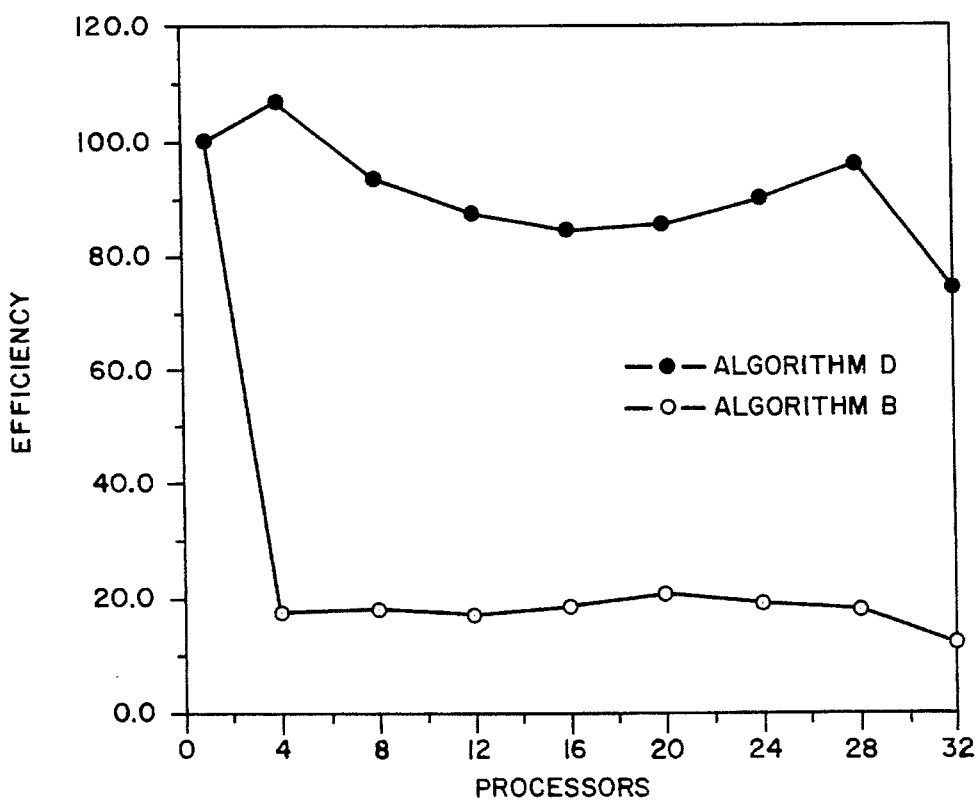
FIG_9

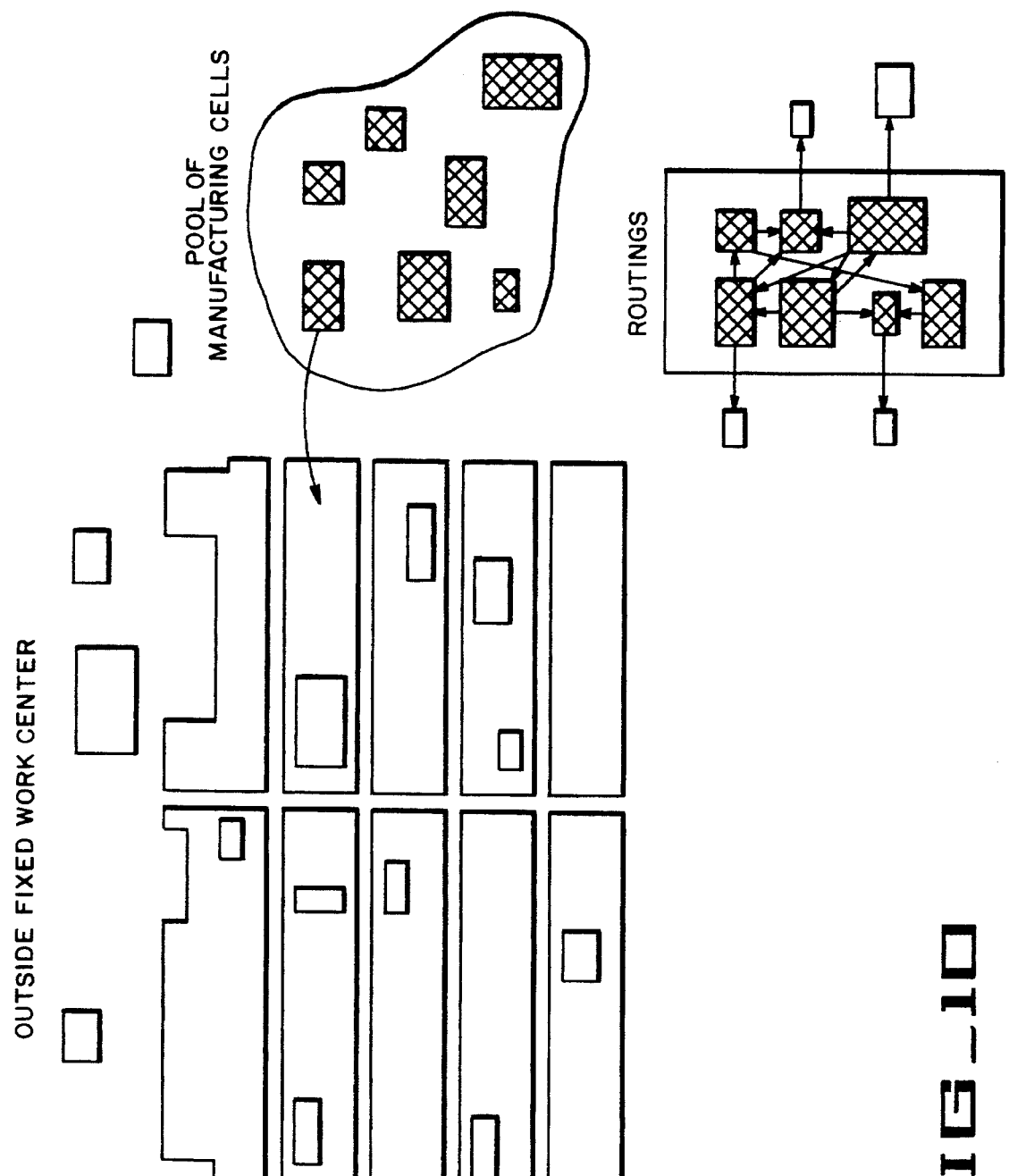
FIG_10

SYSTEM FOR PARALLEL IMPLEMENTATION OF COMBINATORIAL OPTIMIZATION IN A MULTIPROCESSOR NETWORK FOR GENERATING SEARCH GRAPHS FOR SOLVING ENUMERATIVE PROBLEMS

BACKGROUND OF THE INVENTION

The invention disclosed herein relates to a new method and apparatus for enhancing the performance of a Parallel Implementation of Combinatorial Optimization (PICO) system which is referred to in assignee's prior application Ser. No. 07/478324, filed Dec. 2, 1990, now abandoned, as a Generalized Combinatorial Optimization Shell (GCOS). The prior application is directed toward the use of a multiple processor method and system to solve graph search or combinatorial optimization problems. The present invention is a method and apparatus to enhance the performance of a multiprocessor network wherein node generation, upper and lower bound or bound generation, bound evaluation and node pruning commands from the user are implemented into the processor network through the intermediacy of the PICO system and hardware.

SUMMARY OF THE INVENTION

The present invention includes a method and apparatus for generating pans of a search graph or all pans of a search graph prior to their actual predecessors in the search graph. As the number of processors increases in a multiprocessor network system, synchronization and communication within the network become complex and outstrip the complexity encountered with search efforts for combinatorial optimization across processors. Particularly, whereas methods of solving search graph and other combinatorial problems with nodes having a defined state by list of parents, list of offspring's and upper and lower value or cost bounds are well established in the art, the present invention enables the generation of successors of nodes without regard to or dependence on the existence of the parent or offspring in the search graph. Thus, the present invention provides a fully asynchronous and homogeneous method and apparatus with a system design based on generator driven and locally ordered expansion queues. Accordingly, this invention enables addition or removal of predecessor nodes and re-evaluation of bounds downward for an offspring node for a given processor; and similarly enables the addition and removal of successor nodes, re-evaluation of bounds upward for a parent node in a given processor system. This method of "jumping" successive generations in the search graph is known as a "shadow node" method of implementing a "shadow node" subsystem to the PICO system. The term is used to distinguish a class of nodes in the search graph that are not part of the actual search graph being generated by the PICO system. Accordingly, the method and apparatus disclosed herein relates to a separate subsystem that generates its own version of the search graph and provides a solution to, for example, an enumerative search problem, graph search or combinatorial optimization without regard to either the existence of a root node, offspring or parent node or the root node's viability for being a part of the solution.

The method and system of generating shadow nodes includes one of two modes namely: 1) either the nodes of the shadow node search graph are integrated into the main search graph after a determination is made that they should be a part of it, or (2) the main search graph is not developed and the shadow node search graph is constructed locally on each processor until the search problem is solved. In the experience of the inventor, the latter mode is functional for certain types of problems, where global bounding and infeasibility information can be used to reduce the size of the locally maintained search graph.

In view of the foregoing, it is one of the objects of the present invention to provide a near 100% utilization of a processor time in a multiprocessor network. Particularly, the present invention enables one to eliminate the problem associated with idle process capacity by generating shadow nodes which are stored in the idle processors to be used in some future problem solutions.

It is therefore the object of the present invention to provide a method of parallel implementation of digital processors so as to solve an enumerative search, graph search problems and the like wherein a root processor is used to have a direct interface with a user and a PICO system operates in intermediacy and in cooperation with the root process and a multiprocessor network. The method includes initiating the PICO system by means of control parameters selected by the user at the root processor. Initialization functions are used to activate a message subsystem and a node generation subsystem of the PICO hardware. Further a message channel subsystem in the PICO system is activated to interact with the message subsystem and the node generation subsystem. Furthermore, auxiliary functions which interact with the message subsystem and the node generation subsystem are activated. Additionally, by activating a message channel subsystem to interact and link with the message subsystem, an auxiliary functions module and a multiprocessor network, the PICO system is set to operate as an intermediate link between the root processor and the multiprocessor network.

It is further the object of the present invention to provide a method of operating a plurality of digital processors wherein a root processor interfaces with a user and a PICO system operates in intermediacy between said root processor and a network of processors to solve enumerative problems and the like using a shadow node system generated under a speculative node expansion mode, located in the PICO system, in order to occupy vacant capacities within said network of processors. Moreover, the shadow node is capable of prospective integration into a successor node after a root node of a given search problem is provided by the user. The method includes storing a root node on a list of nodes on an expansion queue of the PICO system. Further, an expansion queue is activated and the first node in the expansion queue is removed. Each node is expanded and allocated to the network of processors. The expanded nodes are hashed. Thereafter, shadow nodes are generated in the PICO system to occupy idle capacity of the processors. The shadow nodes are refined to remove infeasible nodes and to curtail generations of offsprings. Further, the shadow nodes are classified by bounds and/or values and these are compared to the root node to see if there is convergence. The status and identity of converging nodes is communicated to the network of processors to thereby end the search for a solution.

The apparatus of the present invention comprises a multiprocessor network designed to interface with a root processor wherein the PICO hardware is used as an intermediary between them. The PICO system comprises a message subsystem in communication with the root processor. Further the PICO system includes a message channel subsystem connected to the message s subsystem and also provides message links to the processor network and to an auxiliary functions module. A node generation subsystem is connected to the message subsystem. Additionally, the node generation system is connected to the auxiliary functions module and the root processor.

BRIEF DESCRIPTION OF THE DRAWINGS

FIG. 1A is a layout of the system architecture of the PICO system and its connections to the root processor and the multiprocessor network.

FIG. 1B is a depiction of high level interaction between the root processor, the PICO system and the Multiprocessor network.

FIG. 2A depicts node generation and data sharing in a multiprocessor network.

FIG. 2B depicts node pruning and merging of nodes across a multiprocessor network.

FIG. 3A shows the formation of shadow nodes.

FIG. 3B shows pruning and merging of shadow nodes across a multiprocessor network.

FIG. 4 is a flow chart representation for a pseudo code form Algorithm A.

FIGS. 5A and 5B are a flow chart representation for a pseudo code Algorithm B which describes adoption of Algorithm A in a multiprocessor environment.

FIGS. 6A, 6B, and 6C are a flow chart representation of a pseudo code Algorithm C which depicts a shadow node system integrated with a regular node system.

FIGS. 7A, 7B, and 7C are a flow chart of a pseudo code Algorithm D which shows a shadow node system operating independently.

FIG. 8 is a comparative depiction of system as efficiency Versus the number of processors being utilized. It compares system efficiency between the Algorithm C and Algorithm B.

FIG. 9 shows a typical application of a PICO application in a manufacturing cell environment.

FIG. 10 is a comparative depiction of system efficiency versus the number of processors being utilized. It compares system efficiency between the Algorithm D and Algorithm B.

DESCRIPTION OF THE PREFERRED EMBODIMENT

Figure 6B:
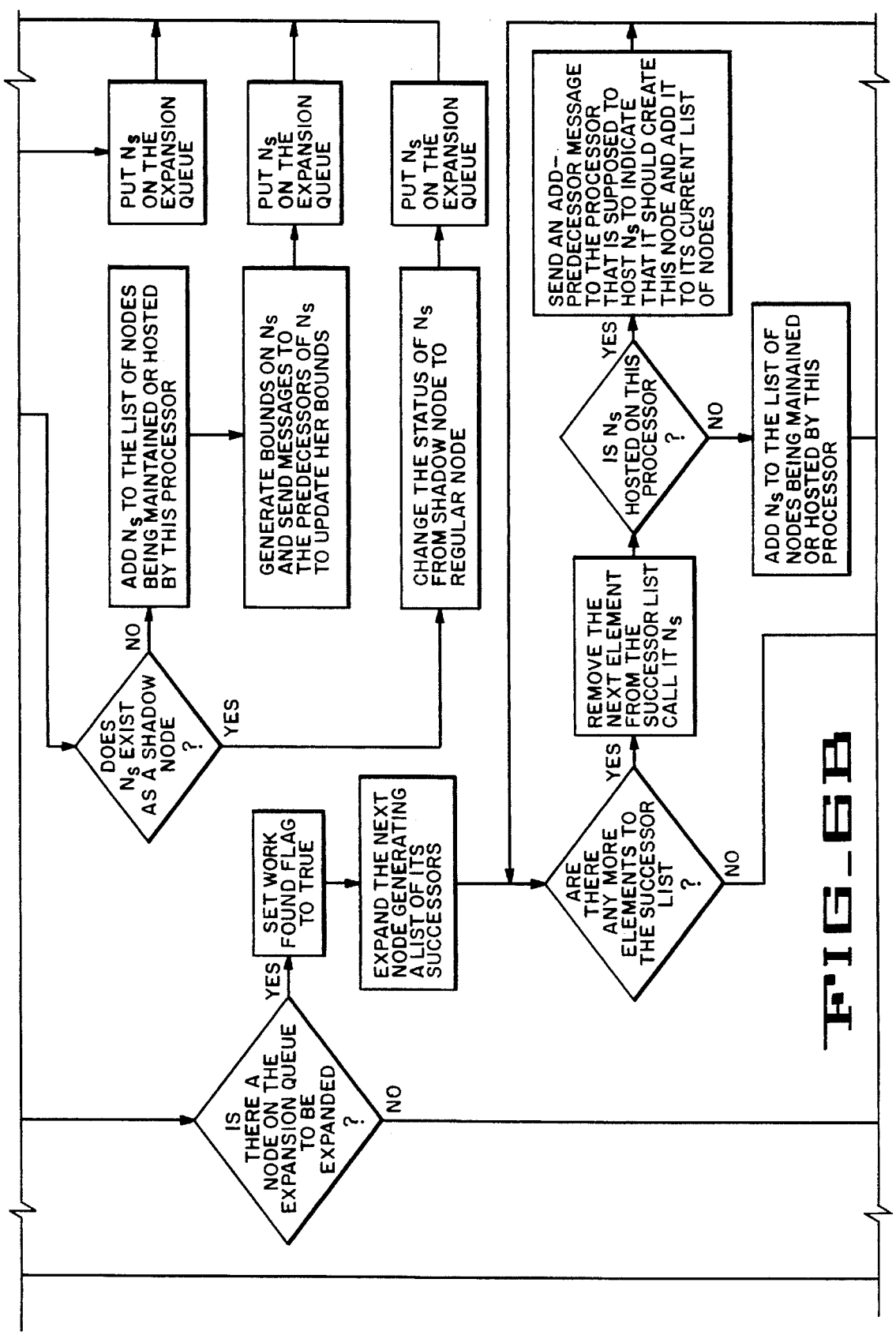

The invention pertains to a method and apparatus that provides an intermediate system between a user's input hardware or interface hardware and a network of processors. The intermediary system includes the PICO system which forms a subsystem for solving enumerative type search problems. More particularly, the PICO system enables the generation of shadow nodes which have unique characteristics and for the core of the PICO system and provide heretofore unknown implementation and integration techniques for a parallel multiprocessor network. In addition to the other unique features discussed hereinbelow, the present invention provides a capability heretofore unavailable particularly because of the shadow nodes' ability to occupy idle capacity and to operate in cooperation with interprocessor channels to provide solutions to graph search, enumerative and other problems. As will be seen hereinbelow, the shadow node system generated by the PICO system creates node elements which are not necessarily pan of the actual search graph. This capability is one of the many significant advantages of the present invention. Particularly, the present invention enables one to adjustably engage and "fill" all the vacant capacities of a plurality of processors in a parallel implementation, thereby increasing the level of use and occupancy of processor capacity.

The system can operate in either one of two modes. In the first mode, the "integrated mode", the system is engaged in the generation of shadow nodes when it would otherwise not have any work to do because some or most of the processors in the system are idle, a phenomenon known as an underload. Accordingly, in an underloaded multiprocessor environment, the PICO system generates nodes that become part of the search graph which can be utilized at some future point in the search process. These shadow nodes may become a part of the actual search graph. Hence, pans of the search graph are generated before their actual predecessors, which are presumed to reside in said search graph, are known to exist or known to be a viable part of the solution. The level of adaptability and congruence of a shadow node into one or more of the parts of the search graph determines the system effectiveness and convergence of the shadow node in solving a particular problem.

The shadow node system can also be run in a second mode, called the "independent mode". This mode is used to solve certain types of problems. For homogeneous graphs wherein all nodes are minimizing or maximizing, where the feasibility and cost of nodes provide information that can be used globally, the shadow node system can be used independently to generate the graph. In this case each processor proceeds independently, generating shadow nodes until a globally optimal solution is found.

Some applications require the use of both the "integrated" and "independent" modes. In the operation of both the "integrated" and "independent" modes, assuming the operation to be based on homogeneous graphs, information that can curtail the size of the search graph is passed to other processors as both shadow nodes and regular nodes are generated. Assignee's prior application Ser. No. 07/478324, now abandoned, outlined a method for passing global bounds information. As an extension of this method, infeasibility states can also be used to limit the number of nodes expanded. In other words, once a node is identified as an infeasible "match" or solution to a given search graph problem, further generation of successor nodes of the type can be curtailed. Particularly, for some types of problems, such as mixed integer programming, states may be generated that are infeasible, i.e., violate the constraints and conditional boundaries of the problem. Infeasibility is discovered when bounds are generated. Generally, infeasibility of a parent node implies that any successor nodes will also be infeasible. This type of information can be shared with other processors so that a node can be removed from the expansion queue if its parent is infeasible. A shadow node can be used to carry such information throughout the multiprocessor network thereby enabling the system to "tag" and remove such nodes.

Referring now to FIG. 1A, the hardware structure of the PICO system 10 is shown integrated with a root processor 12 and a multiprocessor network 14. The Pico system 10 comprises subsystem hardware with specialized functions dedicated to carry out specific operations within the network. As indicated in FIG. 1A, the PICO system 10 includes three major subsystems with message handling and node generation functions. FIG. 1B provides a pictorial depiction of the dynamic interaction between the PICO system 10 and root processor 12 and the multiprocessor network 14.

Referring now to FIGS. 2A & 2B, a network of processors is shown sharing node generation information therebetween.

The sharing of data between the processors and the pruning of nodes is cumbersome, as depicted in FIG. 2A because of the need to merge and sort the data between the processors before transferring a feasible node into one of the processors.

In contrast, FIGS. 3A & 3B depict the creation and development of a shadow node at different time intervals. In spite of the non-synchronous temporal generation of the nodes, symmetry between compatible nodes is obtained thereby making the transfer and exchange of node information across processors relatively s simple. In other words, when a shadow node is used to share data between processors, there is no need to presort, merge and symmetricize nodes. This unique feature of shadow nodes enables the PICO system 10 to perform solutions faster and renders the shadow node system readily adaptable to a variety of nodal families in a processor.

In order to properly describe the shadow node system and its integration into the PICO system 10, reference is made to the high level description of the general approach to solving search problems provided in code form as Algorithm A as shown in flow chart form in FIG. 4. Referring now to FIG. 1 in more detail, Algorithm A is initiated by putting a root node on a list or array of nodes to be expanded. This array of nodes is called expansion queue or open list. A "begin" command is effectuated while the search problem has not been solved. The determination as to the condition of the search problem being solved is dependent upon the given characteristics of the specific search problem being considered. If the search problem is solved, the Algorithm is stopped. However, if the search problem is unsolved, the first node from the expansion queue is removed. This node is assigned the initial "N". A set (N) of successors of N are then generated which provide the bounds or actual cost of the value of each element, $N_S \in SUCC(N)$. Thereafter, the list of successors is sorted and/or merged into the expansion queue according to some ordering criteria. The cost and bounds of all nodes in the current search graph based on the newly generated costs and bounds for the elements in SUCC (N) and the rule which assigns costs to nodes based on the costs of successor nodes are updated. Using the costs and/or bounds of the newly generated nodes, these successor nodes are identified and removed from the expansion queue and search tree thereby pruning the nodes to a manageable structure. This process is ended while the search problem remains unsolved.

Referring now to the flow chart in FIGS. 5A and 5B, Algorithm B renders a high level description of how PICO 10 works to implement the search process described by Algorithm A in a multiprocessor environment. Algorithm B is initiated by confirming if the processor is running on the root processor and then putting the root node on a list of nodes to be expanded. It should be noted that the multiprocessor network 14 in this example comprises a root processor that is distinguished from the other processors in the system. Further, in the present system, the root processor 12 is the processor having a direct interface with the user. The system is initiated while the search problem has not been solved. Consequently, a routine is started while there are messages to be processed. The next message is removed from an array or queue and is processed. Particularly, if the next message is an add-predecessor message, then a check is made to see if the successor node $N_S$ as indicated in the add-predecessor message exists. The operations involved in processing any given message depend on the message type, and are discussed in detail in the original application, now pending. If the successor node $N_S$ does not exist the system will create the node $N_S$, a shadow node, and put it on the expansion queue. However, if the node exists s initially and has not been expanded and is not on the expansion queue, then the node is placed on the expansion queue. The process is terminated if the message is an add-predecessor. The termination is effectuated while there are messages to be processed. The subroutine is effective if there is a node on the expansion queue to be expanded. If such is the case, the node is expanded to generate the set, SUCC (N) of successors of N, in some order. For each successor, $N_S \in SUCC(N)$, the upper and lower bounds or the actual value of $N_S$ is generated and it, i.e. $N_S$, is added to the list of nodes being maintained or hosted by the processor. Each processor "hosts" or is responsible for a subset of all the nodes in the system. Determination of whether a given processor hosts a given node is made with a "hashing function", an addressing technique used for storing and retrieving. Thereafter, the list of successors is sorted and/or merged into the expansion queue according to some ordering criteria. Further, a message is sent to update the cost and bounds of all predecessors of node $N_S$. If $N_S$ is supposed to be hosted on the current processor, the operation is terminated. However if $N_S$ is supposed to be hosted on another processor an add-predecessor message is sent to the processor that is supposed to host $N_S$ to s indicate that it should create the node and add this newly created node to its current list of nodes. Finally, the system is terminated if there is a node on the expansion queue to be expanded while the search problem has not been solved.

The shadow node system maintains its own open list or expansion queue distinct from the open list or expansion queue maintained by the regular system. As discussed supra, nodes on the shadow node expansion queue are referred to as shadow nodes. The algorithm for how this list is expanded depends upon the mode of operation. For example, in "integrated mode" when the multiprocessor system is idle, i.e. when there are no messages to be handled and the regular expansion queue does not have any nodes, the PICO system 10 generates the successors of a node from the shadow node queue. When such a successor of a shadow node is generated a check is made to see if it is hosted on the given processor. This check is made by retrieving the number of the host processor and determining its processor hash function value. If a successor node is hosted on the given processor, a check is made to see if it is currently in the table of generated nodes hosted on the given processor. If the node is listed in a current table, then the successor is not added to the shadow node queue. Otherwise, the bounds for the successor shadow node are generated and it is added to the shadow node expansion queue and is also stored in the table of nodes generated for the given processor.

As discussed herein above, an "independent mode" of the shadow node system can be used to solve certain types of problems. In "independent mode", the regular expansion queue is not utilized and only messages are processed. With the exception of termination and "handshaking" messages, only bounds and feasibility information messages are sent and received in order to curtail the amount of node expansion. When there are no messages to process, the system expands by generating the successors of a node from the shadow node queue in accordance with the subroutine sequence discussed hereinabove. When a successor of a shadow node is generated, a check is made to see if it is hosted on the given processor. This check is made by retrieving the number of the host processor and determining its processor hash function value. If a successor node is hosted on the given processor, a check is made to confirm the following: (1) if it is currently in the table of generated nodes hosted on the given processor or (2) if the node is a successor of any nodes in a local infeasibility table. If either of these conditions are confirmed, then the successor is not added to the shadow node queue. In the alternate if either one of these conditions are non-existent the bounds for the successor node are generated. If the bounds are "better" in their relevance and proximity to the solution than the current global bounds, these are replaced and a global bounds message is sent to all other processors. However, if the node is infeasible, then it is added to an infeasibility table and the state of the node is sent to all other processors in a feasibility message. Finally, the successor shadow node is added to the shadow node expansion queue.

A high level description of the PICO system 10 Algorithm with an embedded shadow node systems operating in "integrated" and "independent" modes is provided as Algorithms C and D. Algorithm C outlines the "integrated" shadow node system and Algorithm D describes the "independent" shadow node system. FIG. 6A, 6B, and 6C show a flow chart representation of Algorithm C, which comprises the shadow node system integrated with the regular node system. The algorithm is initiated when the process runs on the root processor with the root node placed on a list of nodes to be expanded. The root node is also placed on a list of shadow nodes to be expanded. While a search problem is still unsolved, a "begin" command is deployed and remains active as long as there are messages to be processed. Accordingly, a message queue is created and the processor is trained to remove the next message from the message queue and process it. If in particular, the message is an add-predecessor message a command is issued to check if the successor node $N_S$ as indicated in the add-predecessor message exists as a regular or non-shadow node. However, if the node $N_S$ has been generated as a shadow node then the status of the shadow node is changed to make it a regular node and it is placed on the expansion queue. At this point the bounds for the node will be generated. If the node N has not been generated, it is created and placed on the expansion queue. In the alternate, if the node exists as a regular node and has neither been expanded nor located on the expansion queue, then it is placed on the expansion queue. The search is ended if an add-predecessor message is encountered.

If there is a node on the expansion queue to be expanded, the node is expanded and the set, SUCC(N) of successors of N, are generated in some predetermined order. For each successor $N_S \in$ SUCC(N), a check is made to see if $N_S$ is supposed to be hosted on the current processor or send a message to the processor that is as supposed to host $N_S$. If $N_S$ resides or is hosted as the current processor, the bounds of $N_S$ are generated and $N_S$ is added to the list of nodes being maintained or hosted by the processor. Thereafter, the list of successors is sorted and merged into the expansion queue in accordance with a predetermined ordering criteria. Further, messages are sent to update the bounds of all predecessors of node $N_S$. If $N_S$ is hosted on another processor a message is sent to the processor hosting $N_S$ to indicate that it should create the node $N_S$ and add this node to its current list of resident nodes. The operation is terminated if there is a node on the expansion queue to be expanded. Accordingly successive nodes are expanded until all hosted $N_S$ nodes are expanded. If there are no regular nodes to be expanded the next node, $S_S$, from the shadow node queue is removed and expanded. If the $S_S$ is supposed to be hosted by the current processor, then the upper and/or lower bounds of $S_S$ are generated.

Figure 7C:
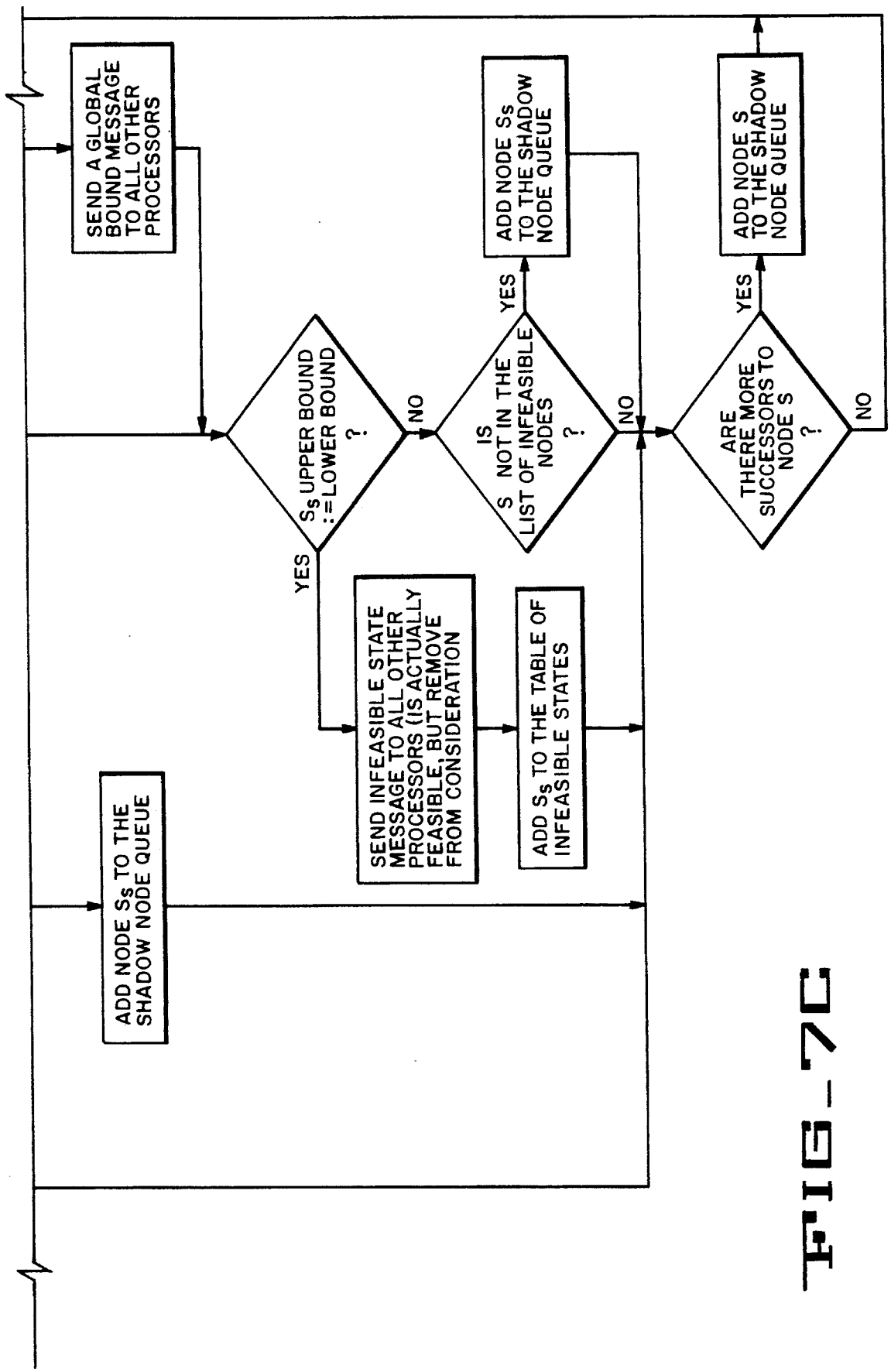

A flow chart representation of Algorithm D is shown in FIGS. 7A, 7B, and 7C, Algorithm D is initiated by putting the root node on a list of shadow nodes to be expanded. While there are messages to be processed, the next message is removed from the next message queue and processing is started. If in particular the message is a global-bounds message then a check is made to see if the global bounds contained in the global bounds messages are better than the existing global bounds. If they are better, then the existing global bounds are replaced by the better ones. If the message is an infeasible-state message this information is added to the table of s infeasible states such that it is identified with that group or list. The next node from the shadow node queue is removed and assigned the node notation "S". If node S is not in the list or group of infeasible state or a descendent of a state in the list, then the set SUCC(S) of successors of S is generated. Further, for each successor, $S_S \in$ SUCC(S), and if $S_S$ is supposed to be hosted by the current processor, the upper and/or lower bounds or the actual cost for $S_S$ are generated. If the bounds of $S_S$ are better than the current global-bounds then, a global-bounds message is deployed to all other processors. However, if $S_S$ is fathomed, i.e. upper and lower bounds are of equal magnitude, as or if the current global bounds can be used to prune $S_S$, then a description of the state of $S_S$ is added to the table of infeasible states. of infeasible states. Accordingly, an infeasible-state message containing a description of the state of $S_S$ is sent to all other processors. If another condition exists, $S_S$ placed on the shadow node expansion queue and the operation is terminated while the search problem remains unsolved.

Referring now to FIG. 8, a graphical depiction of efficiency of parallelism is disclosed wherein a set of parallel processors versus number of processors are compared in light of Algorithm B, the original PICO system 10 algorithm (base system), and Algorithm C (shadow node system). Use of Algorithm B resulted in efficiencies close to the predicted upper bound of $e_p(n)=1/n$. For example, using 8 processors an efficiency value of 11.6% versus a 12.5% predicted value was obtained. However, as shown in the graph, the use of the integrated shadow node system, Algorithm C, dramatically increases multiprocessing efficiency to near 100%.

Referring now to FIG. 9, a particular application involving the solution of a mixed integer program is shown. The application involves a solution for a location assignment of machining cells of various sizes in a manufacturing task to thereby optimize a typical manufacturing cell operation. Machines and cells are to be oriented to minimize transportation costs associated with moving parts between machines and cells and between the cells and other off-site facilities. The constraints for the system include that the cells should be non-overlapping, the machines fixed in a location and both the machines and the cells have fixed boundaries. Candidate locations were constrained by obstacles and a plurality of fixed machining centers.

FIG. 10 compares the performance of Algorithm D, the independent shadow node system, with Algorithm B. Multiprocessing efficiency, based on Algorithms D and B are compared in solving a particular instance of a shop floor planning problem. It should be noted that Algorithm B is the original PICO system 10 algorithm. The multiprocessing efficiency was increased on average by 4½ times from 20% to 90% when the shadow node system or Algorithm D was used to solve the problem. Accordingly, the multiprocessing environment, utilizing the shadow node system is conducive to a substantial improvement in the performance of the PICO system 10.

The components of the PICO system 10, interact through message passing. This is accomplished physically by sending data through computer hardware channels to multiprocessor network 14. The components of PICO system 10 exist as software modules operating on the multiprocessor network 14. These components act by interpreting these data streams as messages.

The PICO system 10 is activated by running a computer program that initializes and configures the system to solve a particular search problem of interest to the user. This is primarily accomplished by supplying the program with data, typed on a computer terminal or read from a file, indicating the type of problem to be solved and information on the configuration of multiprocessor network 14. These processors run PICO system 10 software components that process messages resulting in action which govern the generation and exploration of the search graph. On startup, for each processor, the initialization functions are activated to setup memory allocation, setup message channels to match processor processors to message channels, and initialize the memory allocation system.

Referring to FIG. 5, the initial root node is generated on the host processor. Using the hashing mechanism described hereinabove, offspring generation messages are routed to other processors on the network. As the search continues, other types of messages are sent between processors including bounds and pruning information. These messages are interpreted by the PICO system 10. The message channel subsystem in PICO system 10 receives the message and determines if the message is intended for that particular processor. If not the message is forwarded to tile appropriate processor. If the message is directed to that particular processor, it is passed to tile message subsystem for appropriate action, inter alia, node generation, bounds updating and pruning. Typically PICO system 10 will make use of node generation subsystem to generate new nodes in the search graph that makes use of a user defined computer and shutdown the program when a termination message is received. Information is transferred between subsystems either by calls to certain functions that take action, modify, create or destroy a node data structure.

The method and system of the present invention provide significant advances and advantages over prior systems. Particularly, the present invention enables the generation of shadow nodes with unique characteristics. Primarily, these shadow nodes have no predecessors and are not offsprings traceable to any nodal parentage. These shadow nodes provide additional problem solving capability and efficiency enhancement to a parallel processor system. Accordingly, the speed at which complex problems can be solved is only limited by the number of processors in the network. Particularly, the shadow node system and method disclosed herein makes it possible to solve a variety of enumerative search problems as rapidly as possible in a multiple processor environment and further accomplish this task by utilizing the processor time and capacity at near 100% level, thereby optimizing processor efficiency and utility.

While a particular embodiment of the invention has been shown and described, it will be obvious to those skilled in the art that changes, variations and modifications can be made therein without departing from the invention in its broader aspects and, therefore, the aim in the appended claims is to cover all such changes and modifications as fall within the true scope and spirit of the invention.

What is claimed is:

1. A method of operating a plurality of digital processors wherein a root processor interfaces with a user and a PICO system operates in interemdiacy between said root processor and a network of multiprocessors to solve enumerative problems and the like using a shadow node system generated under a speculative node expansion mode, in said PICO system, to use idle processor capacity within said network of processors and said shadow node to be prospectively integrated into a successor node by the user and convergence between said shadow nodes and said successor nodes is confirmed, comprising the steps of:

storing a root node on a list of nodes on an expansion queue in a node generation subsystem of the PICO system:

allocating said expanded nodes to the network of multiprocessors;

hashing said expanded nodes;

generating offsprings forming shadow nodes to occupy idle capacity of the network of multiprocessors;

interacting with a message subsystem, initialized by the user, to refine said shadow nodes comprising the steps of:

routing shadow node offsprings via a message channel subsystem in the PICO system;

removing nodes to curtail offspring generation:

broadcasting bounds, values and upper and lower limits of said offsprings to thereby compare with said root node and determine convergence; and routing said broadcast to deploy message to the network of processors via a message channel subsystem in the PICO system;

connecting the PICO system to said root processor via a state vector; and managing memory and shutdown operation of the PICO system by an auxiliary function means.

2. A method according to claim 1 wherein shadow nodes are generated and stored in the network of microprocessors when there is an idle capacity.

3. A method according to claim 1 further comprising the steps of creating shadow nodes before a user inputs the root node to thereby idle capacity of the network of microprocessors and to be used as part of the solution search graph or the like at some future point.

4. A method according to claim 3 wherein said shadow nodes are compared to said root node and matched when at least one of convergence of values and bounds is confirmed.

5. A method according to claim 1 wherein each processor in the network proceeds independently and shadow nodes are generated for each processor and compared in the PICO system until a globally optimal solution is found.

6. A method according to claim 1 further comprising the steps of generating regular nodes and shadow nodes simultaneously wherein a shadow node is used to carry information about said regular nodes to thereby tag and sort feasible and infeasible successor nodes being generated from said regular nodes.

7. An apparatus for parallel implementation of a multiprocessor network to interface with a root processor comprising:

a message subsystem in communication with said root processor;

a message channel subsystem connected to said message subsystem and further having message links to the multiprocessor network and to an auxiliary functions module;

said auxiliary functions module comprising a memory management portion and a system shutdown portion; and a node generation subsystem connected to said message subsystem and further having connection to said auxiliary functions module and the root processor.

8. The apparatus according to claim 7 wherein said auxiliary functions module includes a two-way communication with said message channel subsystem.

* * * * *